United States Patent [19]

Sweeney

[11] Patent Number: 4,565,159
[45] Date of Patent: Jan. 21, 1986

[54] ANIMAL FEEDER
[75] Inventor: John W. Sweeney, Boerne, Tex.
[73] Assignee: Sweeney Enterprises, Inc., Boerne, Tex.
[21] Appl. No.: 640,026
[22] Filed: Aug. 10, 1984
[51] Int. Cl.⁴ .................. A01K 61/02; A01K 5/00
[52] U.S. Cl. ................... 119/53; 119/56 A; 222/199
[58] Field of Search ............ 119/51.11, 52 A, 53, 119/56 R, 56 A; 222/199, 200

[56] References Cited

U.S. PATENT DOCUMENTS

| | | | |
|---|---|---|---|
| 2,534,442 | 12/1950 | Harvey | 119/53 |
| 3,029,790 | 4/1962 | Loudon | 119/51 R |
| 3,078,015 | 2/1963 | Wahl | 222/200 X |
| 3,195,508 | 7/1965 | Lehman et al. | 119/51.11 |
| 3,278,090 | 10/1966 | Wahl | 222/199 |
| 3,487,433 | 12/1969 | Fleming | 119/51 R |
| 3,563,420 | 2/1971 | Ansley | 222/199 |
| 3,605,697 | 9/1971 | Szekely | 119/51 R |
| 3,677,230 | 7/1972 | Braden | 119/51 R |
| 3,688,743 | 9/1972 | Rack | 119/51 R |
| 3,730,142 | 5/1973 | Kahrs et al. | 119/51 R |
| 3,741,163 | 6/1973 | Bush | 119/51 R |
| 3,934,762 | 1/1976 | Urayama | 222/200 |
| 3,949,909 | 4/1976 | Sterner | 119/56 A X |
| 3,973,703 | 8/1976 | Peschl | 222/199 |
| 4,027,627 | 6/1977 | Fillion | 119/51.11 |
| 4,276,157 | 6/1981 | Haight | 222/199 X |

Primary Examiner—Robert P. Swiatek
Attorney, Agent, or Firm—Cox & Smith Inc.

[57] ABSTRACT

Apparatus for feeding animals comprising a feed storage hopper with a base plate which is adjusted so as to open a space between the base plate and the walls of the hopper. Feed is dispensed through this space in response to the operation of a motor which is attached to the base plate and which is provided with eccentric weights so as to cause vibrations which are transmitted to the base plate and into the walls of the hopper. The motor can be operated by a timer so as to enable the apparatus to deliver precisely measured quantities of feed at a given rate for a selected period of time at predetermined intervals.

14 Claims, 9 Drawing Figures

ANIMAL FEEDER

BACKGROUND OF THE INVENTION

This invention relates to an automatic animal feeder for commercial or recreational use. More particularly, it relates to an animal feeder which distributes feed by vibrating the base plate and walls of a hopper so that feed is vibrated out of the opening between the bottom of the walls of the hopper and the base plate.

Automatic animal feeders are known in the art, and a variety of devices have been developed which are powered by electrical or mechanical means. Many of these prior art feeders relate to fish feeders. However, these presently known devices have a number of disadvantages and limitations which decrease their utility.

The first problem is the lack of control over the delivery of feed caused by the variety in the form of the feed itself. While some feed is available in pellet form, with individual pellets ranging up to an inch long, feed of this size is inedible or undesirable for many forms of aquatic life. Some aquatic life, because of their size or dietary needs, require that individual pieces of feed be very small. In fact, many types of immature aquatic life require that the feed be of almost flour-like consistency and some types are best raised on a flour-like feed which has been impregnated with oil. Conventional feeders normally rely on a mechanical motion to take a measured amount of feed and throw it or drop it into the water. While feeders of this type will normally work for pellet-sized feed, they have significant disadvantages and limitations when used with feed of flour-like consistency or oil-impregnated flour-like feed. For instance, wind will often carry the flour-size feed away before it hits the water. Also, flour-sized feed is susceptible to clumping together due to moisture, which interferes with the working mechanism of feeders of this type. Particularly prone to clumping is feed which has been impregnated with oil. Because of this clumping, these feeders may stop delivering feed even though feed remains in the container portion of the apparatus. Also, the quantity of feed and the rate at which it is released by automatic feeders of this design is unpredictable because of moisture, settling, or changes in flow rate as the level of feed in the storage hopper is lowered. Another problem with traditional feeders is that they are often incapable of delivering small amounts of feed for a short interval of time as required by certain species of water life. Finally, many of the mechanical feeders are unreliable because they have a large number of working parts.

Examples of these unsatisfactory features are shown in the prior art. Lehman (U.S. Pat. No. 3,195,508) discloses a mechanical "thrower", which works satisfactorily only with larger, grain-size feed. Loudon (U.S. Pat. No. 3,029,790) discloses a feeder in which the feed is dispensed through multiple apertures in the bottom of the feed storage hopper which are opened and closed by a crank. This device is incapable of breaking up fine consistency or oil-impregnated feed which has clumped together because of moisture and is susceptible to binding and clogging by finely ground feed. Fillion (U.S. Pat. No. 4,027,627) is another of the throwing feeders, with the accompanying drawbacks, mentioned above.

Bush (U.S. Pat. No. 3,741,163) and Kahrs (U.S. Pat. No. 3,730,142) are demand responsive fish feeders in which the fish bump into a pendulum which hangs from the feed hopper down into the water, and as the pendulum rocks, it dislodges feed from the hopper. Such feeders are undesirable for several reasons. First, they are demand responsive, so that no control is available over the feed rate. Also, when the pendulum tilts, the feed is essentially dumped off of a platform on top of the pendulum. Such a design could only work with large grain-size feed as finer feed would continuously flow from the feeder. Braden (U.S. Pat. No. 3,677,230) is another demand feeding apparatus similar to the Bush patent and has similar drawbacks. Additionally, the pendulum is attached to a stopper which releases feed as it is tilted from side to side by the movement of the pendulum. While this design may allow for greater control over smaller size granules of feed than the designs disclosed in Bush and Kahrs, it still suffers the other problems listed with regard to Bush and Kahrs. Another similar device is that disclosed in Rack (U.S. Pat. No. 3,688,743), which is directed to a demand feed dispenser operated by a pendulum in the water. The pendulum rotates a pin, the head of which acts as a stopper in the bottom of the hopper. Greater control may be maintained by the apparatus disclosed in the Rack patent over the delivery of finely ground feed, but there is no provision for preventing moisture from causing the feed to clump together.

Szekely (U.S. Pat. No. 3,605,697) discloses a shaker attached to the vibrating portion of an alarm clock. This design is also susceptible to the clumping of finely ground feeds and the concomitant inability to consistently dispense a precisely measured quantity of feed. Also, it is unable to dispense oil-impregnated feeds.

Therefore, it is an object of this invention to provide a device for feeding fish and other aquatic life which is capable of reliably dispensing all size ranges of fish feed.

Another object of the present invention is to provide an apparatus capable of controlling the flow rate of the feed delivered during the feeding period.

Another object of the invention is to provide a means for breaking up feed which is clumped together within the device due to moisture or the oil with which the feed is impregnated.

A further object of the invention is to provide a device with a means to deliver precisely measured quantities of feed at selected feeding intervals.

A still further object of the invention is to provide a device which can deliver all the feed stored in the hopper so that the feeder does not stop dispensing feed even though some feed remains inside the hopper.

Other objects of the invention will become apparent as the invention is described.

SUMMARY OF THE INVENTION

The present invention overcomes the disadvantages and limitations of the prior art devices by providing a base plate, means mounted on the base plate for vibrating the base plate, wall means mounted to the base plate in spaced relationship to the base plate to form a container with a space between the wall means and the base plate, and means for varying the width of the opening between the wall means and the base plate which is operable to change the rate at which feed is dispensed.

DESCRIPTION OF THE PREFERRED EMBODIMENT

Figure 1:
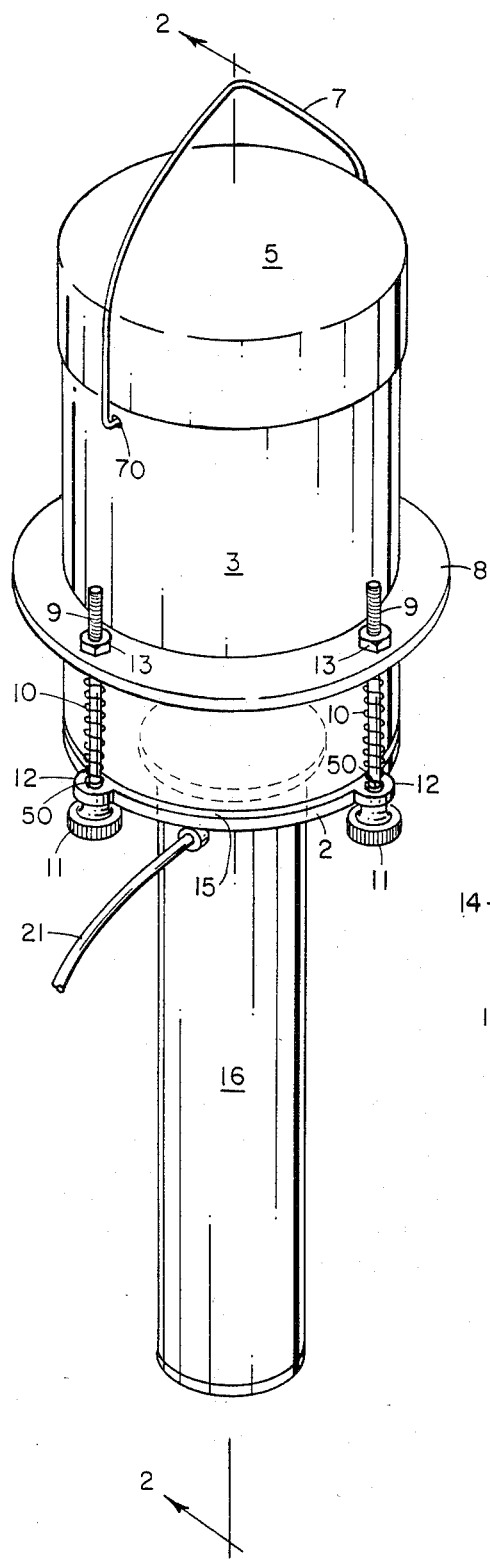
FIG. 1 is a side perspective view of an apparatus constructed according to the present invention which represents an embodiment of the invention which is presently preferred for dispensing finely ground feed.
Figure 2:
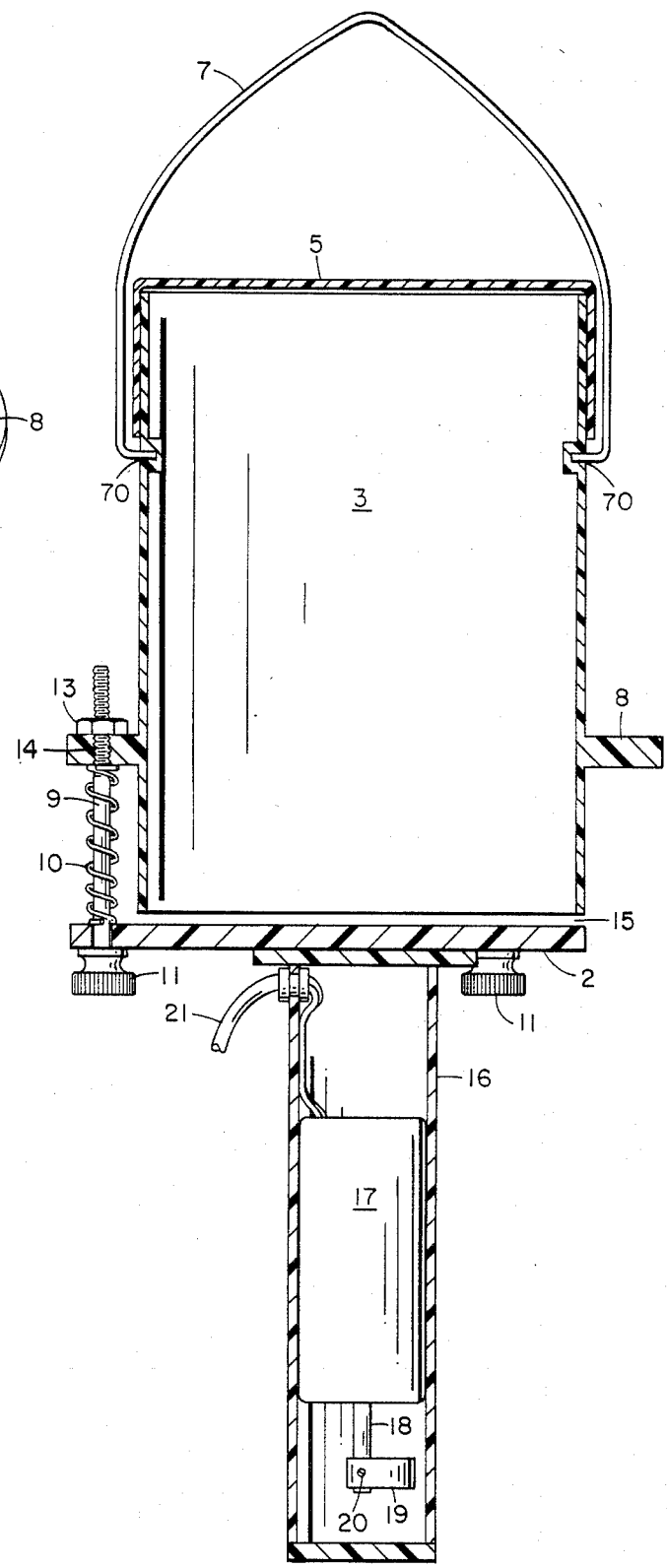
FIG. 2 is a side cross-sectional view of the apparatus of FIG. 1, taken along the lines 2—2 in FIG. 1.
Figure 3:
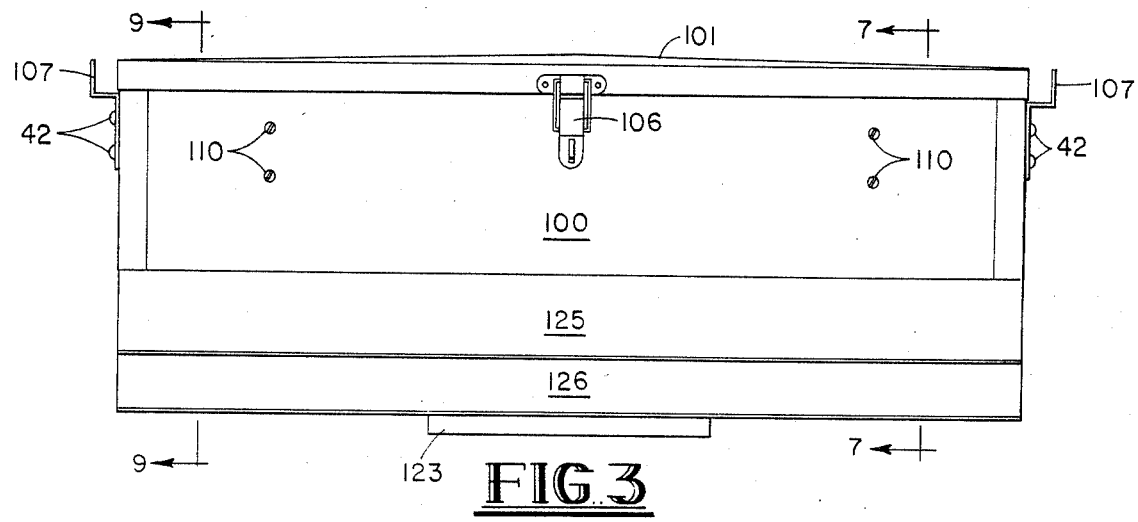
FIG. 3 is a side view of an apparatus constructed according to the present invention which represents an embodiment of the invention which is presently preferred for dispensing feed of larger grain, but which is also capable of dispensing large amounts of finely ground feed.

Referring to FIGS. 1 and 2, there is shown a enclosure 3. The enclosure 3 is a hollow cylinder made of plastic or other suitable flexible material. Enclosure 3 is preferably made of clear or translucent material so that the level of feed in the enclosure 3 can be determined by sight. A lid 5 covers the top of the enclosure 3, and the apparatus is hung over the water from a support (not shown) by bail 7 anchored to the walls of enclosure 3 in hole 70. Hole 70 does not extend through the side wall of the enclosure 3 so as to better exclude moisture from the contents of the enclosure. The enclosure 3 has an integral flange 8 on its exterior wall. Enclosure 3 is held in spaced relationship to the base plate 2 by screws 9. Screws 9 extend through holes 50 in the flange 12, which are integral with the base plate 2, and up through holes 14 in flange 8 on the walls of enclosure 3. A nut 13 holds the screw 9 in place, although the hole 14 in the flange 8 is also threaded so that the screw 9 directly engages the enclosure 3. As screw 9 is rotated by means of cap 11, the base plate 2 is raised and lowered in relation to the enclosure 3, thereby varying the size of opening 15 between the base plate 2 and the bottom of the walls of the enclosure 3. The preferred embodiment is most efficiently operated when three (3) screws 9 are used, and where the three (3) screws 9 are spaced equidistant about the perimeter of the enclosure 3. Coil springs 10 are provided around screws 9 between flange 8 and flanges 12, bearing against each flange, to help maintain opening 15.

The vibrating means of the present invention is comprised of base plate 2, cover 16, motor 17, motor shaft 18, and eccentrically mounted weight 19. Motor 17 is encased by a cover 16 which is integral with the base plate 2. When the motor 17 rotates motor shaft 18, the eccentrically mounted weight 19 causes the vibrations to be transmitted to the cover 16, which, in turn, transmits the vibrations to base plate 2. It is necessary that the base plate 2 and the walls of enclosure 3 be made of a material capable of flexing because the vibrations set up on the base plate 2 must also vibrate the walls of the enclosure 3. In this manner, feed which is stored inside the enclosure 3 will flow out of the opening 15 as the base plate 2 and walls of enclosure 3 vibrate.

The eccentric weight 19 is retained on the shaft 18 by a set screw 20. The flow rate of the feed may be changed by varying the speed of motor 17 or by changing the size of opening 15 by turning the screws 9. The size of opening 15 is also adjusted in accordance with the grain size of the feed used. The vibrations set up by motor 17 will help to keep feed broken up which would otherwise clump together due to moisture or oil content.

The base plate 2 may be optionally provided with integral longitudinal ridges or baffles (not shown), projecting upwardly into the enclosure 3 and radiating outwardly from the center of the base plate 2. These optional ridges increase the ability of the apparatus of the present invention to break up clumps of feed within the enclosure 3. This additional capability stems from the fact that the feed within the enclosure 3 swirls as it moves downwardly towards the opening 15 when motor 17 is switched on. As the feed is vibrated over the baffles by the swirling motion set up by the vibration, the clumps are broken apart.

The apparatus shown in FIGS. 1 and 2 is preferably connected to a power source (not shown) by power cord 21 through a timer (not shown) so that the motor 17 is turned on and off at predetermined intervals. In a preferred use of the apparatus shown in FIGS. 1 and 2, the apparatus is connected to a timer which is capable of switching the motor 17 on and off at frequent intervals (e.g., every 30 seconds) for a period of time which may be as short as a fraction of a second so as to deliver a precisely measured amount of feed. Such a feeding regimen is advantageous in the raising of certain types of aquatic life during their immature stages of growth. The motor 17 may be an AC or a DC motor, with appropriate current transformers used to allow for connection to conventional power sources.

Larger versions of the apparatus shown in FIGS. 1 and 2 are also contemplated. Changes in the materials used for the base plate and enclosure may be necessary depending upon the size of the particular embodiment. For example, an apparatus was constructed in which the base plate 2 and the enclosure 3 were made of metal to provide more flexibility than that provided by plastic when formed into a larger device. However, plastic materials with the proper flex characteristics may also be used in these larger versions. Further, because of the greater weight of such larger devices, the bail 7 shown in FIGS. 1 and 2 must be changed into a series of rungs or even a series of legs so as to provide the necessary support. Regardless of the design of the support means, it is understood that the supports must be attached to the device in a manner which will not damp the vibrations set up in the base plate and enclosure walls by the motor. For instance, in the larger embodiment of the device shown in FIGS. 1 and 2 which was constructed of metal, brackets were attached to the outer walls of the enclosure with holes at the top of the bracket through which a chain was hooked. The chain was then used to suspend this larger embodiment of the device constructed of metal over the water.

Figure 4:
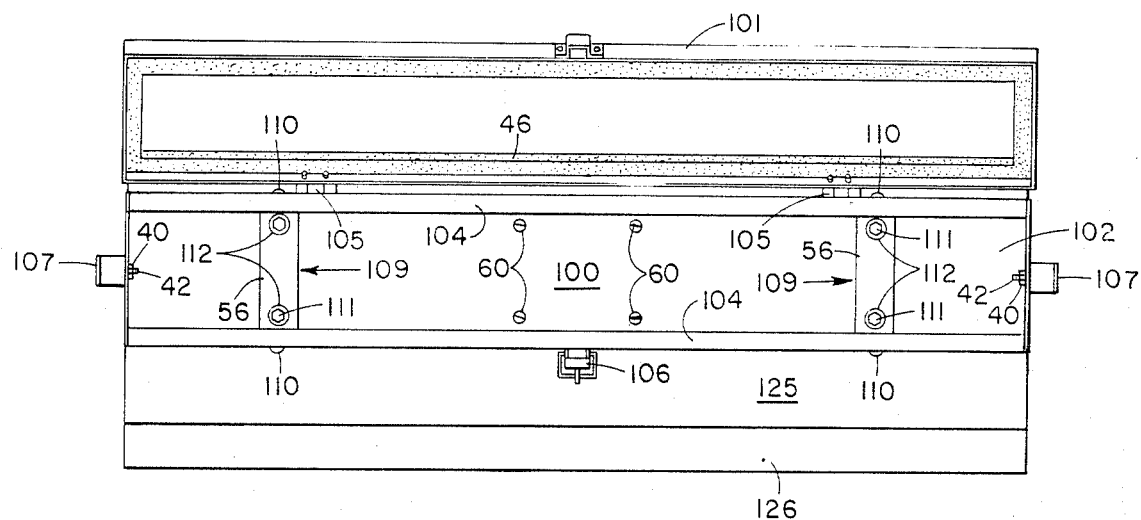
FIG. 4 is a top view of the apparatus of FIG. 3 with the lid open.

Another preferred embodiment of the present invention is shown in FIGS. 3 through 9. This substantially larger feeder is comprised of a rectangular enclosure 100, made of metal or other suitable material capable of flexing so as to provide the necessary vibrations as discussed above. Enclosure 100 is provided with lid 101 attached to the enclosure walls 100 by hinges 105, as shown in FIG. 4, and latch 106. The top of the enclosure walls 104 is folded back towards the interior of the enclosure 100 to form a ledge along the lengthwise walls of the enclosure 100. The inside of lid 101 is provided with a foam strip 46 to reduce the noise caused by the vibration of the walls of enclosure 100 against the inside of lid 105. The entire device may be suspended by appropriate means. The apparatus shown in FIGS. 3 through 9 is suspended from a support (not shown) by fastening chains (not shown) through holes 54 in brackets 107 shown in FIG. 6, connected to the enclosure walls by nuts 40 and bolts 42.

Figure 7:
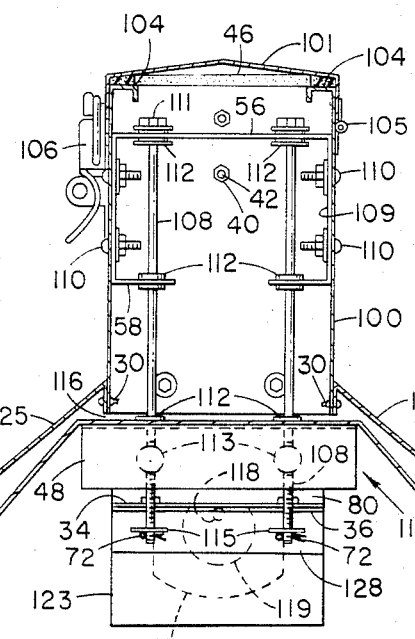
FIG. 7 is a cross-sectional view of the apparatus of FIG. 3 taken along the lines 7—7 in FIG. 3.

As shown in FIG. 7, the enclosure 100 is attached to the base plate 102 by bolts 108. Bolts 108 run through internal brace 109. The internal brace 109 runs across the enclosure 100 and is connected to the enclosure walls on both sides of the enclosure 100 by nuts, bolts and rubber washers, indicated generally at 110. The brace 109 is formed so that bolts 108 run through both an upper 56 and lower 58 portion. The bolts 108 are provided with an adjusting head 111 and washers and bearings indicated generally at 112 at the upper portion 56 of the brace 109 and at the base plate 102. Bearings 112 are also provided at the point at which bolts 108 pass through the lower portion 58 of brace 109. The bolts 108 run through the base plate 102 and threadably engage a cross pin 113, shown in FIG. 5. The cross pins 113 are mounted in holes through flanges 48 which extend downwardly from a base plate brace 114 so that they are held in a constant position. Because the bolts 108 threadably engage the cross pins 113, when the adjusting heads 111 are rotated, they carry the entire hopper 100 closer to or further away from the base plate 102, decreasing or increasing the size of the opening 116, respectively. At the ends of the bolts 108 are a final set of washers 115 and safety pins 72 to prevent the bolts 108 from being completely disengaged from the cross pins 113 by the vibrations set up in the apparatus by the vibrating means.

Figure 5:
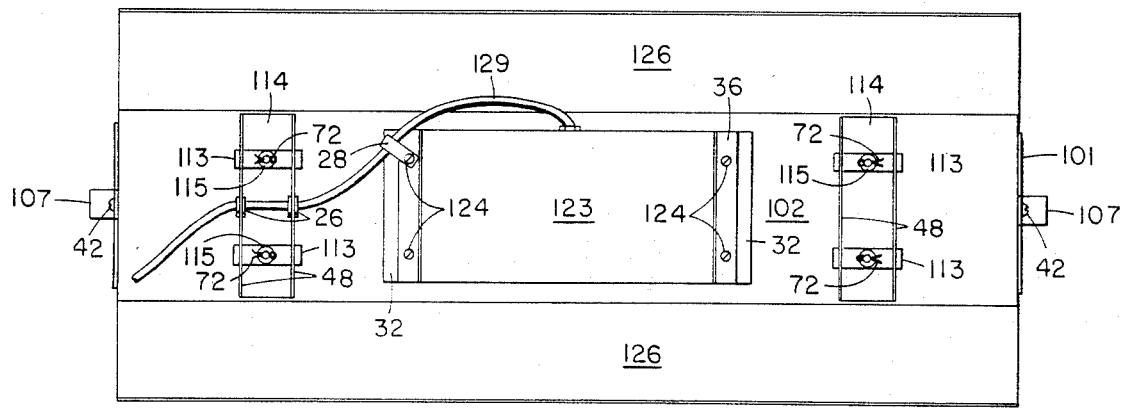
FIG. 5 is a bottom view of the apparatus of FIG. 3.
Figure 6:
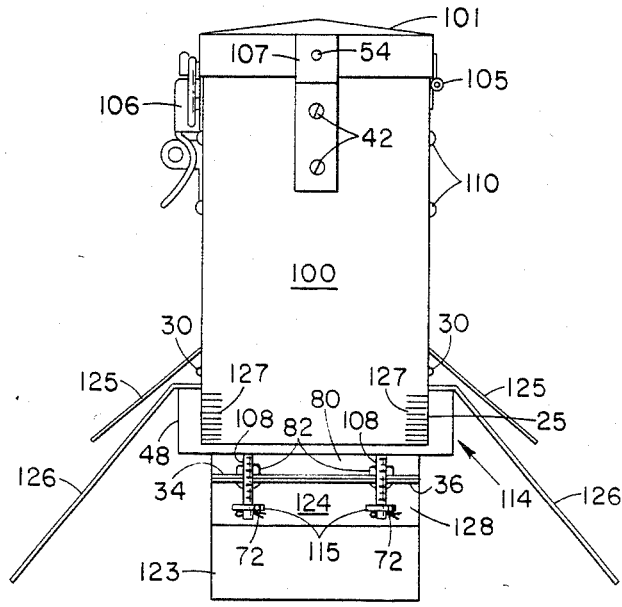
FIG. 6 is an end view of the apparatus of FIG. 3.
Figure 8:
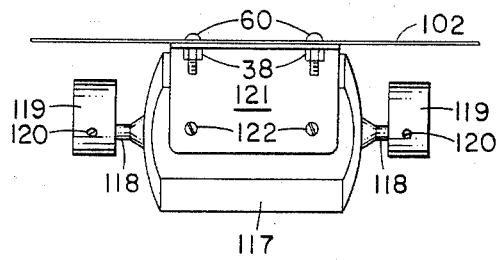
FIG. 8 is a side view of the vibrating means of the apparatus of FIG. 3 with its cover removed.

As shown in FIG. 8, the vibrating means is comprised of bracket 121, motor 117 which is rigidly mounted to bracket 121 by screws 122, base plate 102 to which bracket 121 is rigidly mounted by nuts 38 and bolts 60, motor shafts 118, eccentrically mounted weights 119 and set screws 120. The set screws 120 may be used to adjust the degree of eccentricity of the weights 119, to increase or decrease the magnitude of vibration set up in the base plate 102 and enclosure 100. As noted in describing the first preferred embodiment (cylindrical feeding apparatus), it will also be advantageous in the rectangular embodiment to use a motor with variable speeds, different speeds being more suitable for respective feeds than others. Motor 117 is enclosed within housing 123 which is welded to bracket 128 as shown in FIG. 7. Flange 36 of bracket 128 is attached to flange 34 of base plate bracket 80 by nuts 82 and bolts 124, and flange 32 of base plate bracket 80 is welded to the base plate 102, as shown in FIGS. 5 and 6. The apparatus may optionally be provided with a plurality of motors 117 mounted on brackets 121 to the bottom of base plate 102. A plurality of motors 117 may be used when the apparatus is constructed in dimensions or materials which result in the presence of "dead spots" in the hopper 100, i.e., areas where no vibration occurs. If multiple motors are used, it may be advantageous to operate each motor at a different speed and/or to use eccentric weights of different weights on each motor.

As feed is vibrated out of the opening 116, it will be guided towards the feeding area by upper 125 and lower 126 fins running lengthwise on the sides of the feeder and forming an angle to the sides of the feeder. The top fin 125 is attached to the walls of enclosure 100 by rivets 30 and is attached in such a manner that it provides protection from wind and precipitation. The bottom fin 126 is part of the base plate 102 and is shown in FIGS. 6 and 7 as extending beyond the edge of fin 125. It is understood that, in circumstances which do not call for a wide area of distribution of the feed, fin 126 may be shorter than fin 125 so that fin 125 will provide additional protection from the elements. The fin 125 helps guide the feed towards the feeding area and protect feed from being blown away or rained upon.

In order to accurately set the width of the opening 116, calibration scales 127 are provided at each end of the feeder. (See FIG. 6). The calibrations 127 are marked on an extension 25 of the end walls of enclosure 100. Thus, the calibration scales 127 on the extension 25 will be raised and lowered with respect to the base plate 102 along with the enclosure 100 so that the calibration scales 127 can be used to set the width of the opening 116.

Figure 9:
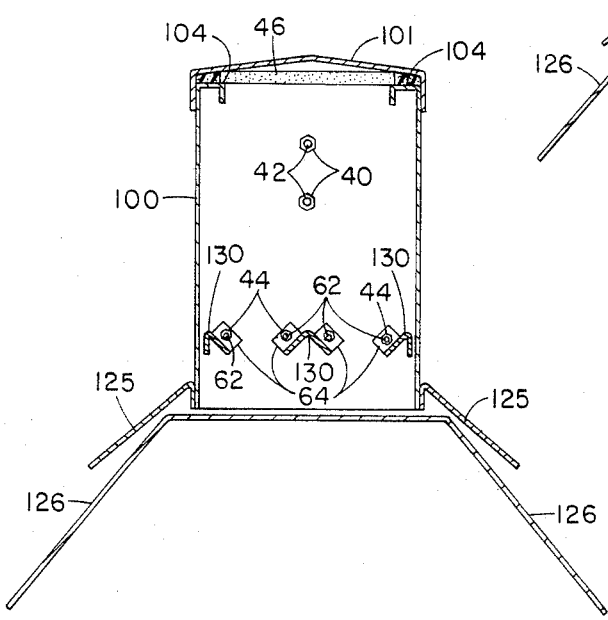
FIG. 9 is a cross sectional view of an alternative embodiment of the present invention taken along lines 9—9 of the apparatus of the type shown in FIG. 3 which has been additionally provided with a set of baffles within the hopper.

Because of the larger size of the apparatus shown in FIGS. 3 through 9, the vibrations set up in the base plate 102 and enclosure 100 by the motor 117 may be less effective at breaking up feed which has clumped together due to moisture or oil than the apparatus shown in FIGS. 1 and 2. Therefore, FIG. 9 shows a series of baffles 130 which are mounted lengthwise inside the enclosure 100. Baffles 130 are held in place by nuts 44 and bolts 62, which project through the end walls of the enclosure 100 and the flanges 64 on the ends of the baffles. The baffles 130 have edges over which the feed must flow as it moves downwardly in the enclosure towards the opening 116. Any feed that has clumped together due to moisture will be broken up by a combination of the feed contacting the edges of baffles 130 as it moves downwardly towards the opening 116 and the vibration of the walls of base plate 102 and the walls of enclosure 100. The baffles may also be integrated with the base plate 102 as described above with respect to the apparatus shown in FIGS. 1 and 2.

The motor 117 of the vibrating means is connected to a power source (not shown) by power cord 129, as shown in FIG. 5, through a timer (not shown) so that the feeder may be operated for a predetermined interval of selected times. Because a preferred use of the apparatus shown in FIGS. 3 through 9 is to suspend the apparatus, as described above, over water to feed aquatic life, power cord 129 is held to the bottom of the apparatus to keep it out of the water by clip 28, held to the flange 36 of bracket 128 by nut 82 and bolt 124, and by passing the power cord through grommet-lined holes 26 in the downwardly extending flanges 48 of base plate brace 114. In a preferred use of the apparatus shown in FIGS. 3 through 9, the feeder is used to dispense larger grained feeds than the feed dispensed by the apparatus shown in FIGS. 1 and 2. However, the apparatus shown in FIGS. 3 through 9 may also be advantageously used to dispense larger quantities of the finely ground feeds than the apparatus shown in FIGS. 1 and 2 is capable of dispensing. This flexibility of operation makes the apparatus shown in FIGS. 3 through 9 particularly well suited for use over runways of moving water which flow into pools or which themselves contain large numbers of individuals of a particular specie of aquatic life being raised, for instance, in a trout hatchery.

The foregoing description of the preferred embodiments is by way of example only and not by way of limitation. It is understood that the present invention is limited only by the spirit and scope of the following claims.

What is claimed is:

1. An animal feeder comprising:
   a base plate;
   means mounted to said base plate for vibrating said base plate;
   flexible wall means connected to said base plate in spaced relationship thereto to form an enclosure with an opening between said wall means and said base plate;
   the means for mounting the flexible wall means to said base plate being operable to transmit to said wall means the vibratory forces exerted on said base plate by said vibrating means wherein the flexing of said flexible wall means is operable to impart an outward motion to said material as it is shaken out of said opening, said mounting means comprising a plurality of adjusting screws connecting said base plate to said flexible wall means and said mounting means being operable to vary the width of said opening between said wall means and said base plate so as to change the rate of flow at which feed is dispensed from the enclosure and to accommodate different sizes and types of feed.

2. The animal feeder of claim 1 wherein said flexible wall means is provided with baffles for breaking up clumps of feed contained within the enclosure formed by said flexible wall means.

3. The animal feeder of claim 1 wherein said base plate vibrating means comprises an electric motor of variable speed, operably connected to one or more eccentric weights.

4. The animal feeder of claim 1 wherein said flexible wall means is provided with indentations or mounts on the external side of the enclosure formed by said flexible wall means operable to receive suspension means.

5. An animal feeder comprising:
   a circular base plate with a plurality of flanges positioned about the perimeter of said circular base plate operable to accept the passage of screws therethrough;
   vibrating means connected to the bottom side of said circular base plate;
   cylindrical flexible wall means of less diameter than said circular base plate with flanges positioned about the perimeter and extending outwardly therefrom and aligned with said flanges of said base plate;
   a plurality of adjusting screw means connecting said wall flanges to said base plate flanges to maintain said flexible wall means in spaced relation to said base plate and operable to transmit vibrations of said base plate to said flexible wall means and thereby induce flexing in said cylindrical flexible wall means to impart a swirling motion to material being vibrated out of the opening between said circular base plate and said flexible wall means.

6. The animal feeder of claim 5, wherein:
   said adjusting screws are operable to vary the width of the opening between the bottom of said flexible wall means and said circular base plate to change the rate of flow of feed being dispensed from the enclosure and to accommodate different sizes and types of feed.

7. The animal feeder of claim 6 wherein said vibrating means is a cylindrical motor mounted inside a tubular container integrally attached to the bottom side of said circular base plate such that the shaft of said motor faces opposite from the bottom side of said circular base plate, said shaft being operably connected to an eccentric weight.

8. The animal feeder of claim 7 wherein said cylindrical flexible wall means contains indentations or mounts on the external side of the enclosure formed by said cylindrical flexible wall means operable to receive a suspension means.

9. The animal feeder of claim 6 wherein said flanges on said circular base plate and flanges on said cylindrical flexible wall means are positioned equidistant about the perimeter of said circular base plate and said cylindrical flexible wall means.

10. An animal feeder comprising:
    a rectangular base plate with angular fins on the long sides of said rectangular base plate, with holes in said rectangular base plate operable to accept the passage of screws therethrough;
    vibrating means integrally attached to the bottom of said rectangular base plate;
    flexible wall means operable to form a rectangular enclosure with horizontal cross-sections slightly proportionally smaller than said rectangular base plate wherein said rectangular flexible wall means have braces mounted on the interior side of said rectangular wall means operable to receive said screws when passed through said holes in said rectangular base plate;
    a plurality of adjusting screw means operable to mount said rectangular flexible wall means in spaced relationship to said rectangular base plate and operable to transmit vibration of said base plate to said rectangular flexible wall means and thereby induce flexing in said rectangular flexible wall means operable to impart an outward motion to said material as it is vibrated out of the opening between said base plate and said flexible wall means.

11. The animal feeder of claim 10, wherein adjusting screw means is operable to vary the width of the opening between the bottom of said rectangular flexible wall means and the top side of said rectangular base plate to change the rate of flow at which feed is dispensed from the enclosure and to accommodate different sizes and types of feed.

12. The animal feeder of claim 10, wherein said vibrating means is a motor mounted to the bottom side of said rectangular base plate and operably connected to eccentric weights.

13. The animal feeder of claim 10 wherein said plurality of adjusting screws are operable to separately adjust each long side of the opening between said rectangular base plate and said rectangular flexible wall means so as to render said feeder operable from only one side or operable at different rates from each side of said opening.

14. The animal feeder of claim 10 wherein said rectangular flexible wall means is provided with baffles consisting of bars running through the enclosure formed by said rectangular flexible wall means and running parallel with the long side of said rectangular flexible wall means and mounted to the side walls of said rectangular flexible wall means, said bars being operable to break up clumps of said material.

* * * * *